March 18, 1947.  M. G. LEONARD ET AL  2,417,769

JOINT RING

Filed Aug. 19, 1944

WITNESSES:
Wm. B. Sellers

INVENTORS
Merrill G. Leonard and
John A. Guidosh.
BY
Paul E. Friedemann
ATTORNEY Patented Mar. 18, 1947

2,417,769

UNITED STATES PATENT OFFICE 2,417,769

JOINT RING

Merrill G. Leonard, Sharon, Pa., and John A. Guidosh, Hubbard, Ohio, assignors to Westinghouse Electric Corporation, East Pittsburgh, Pa., a corporation of Pennsylvania Application August 19, 1944, Serial No. 550,251

5 Claims. (Cl. 285—130)

Our invention relates to joint rings and more particularly to joint rings for torpedoes.

The Government of the United States has been granted a certain royalty-free license for governmental purposes with respect to the invention herein described.

Torpedoes for many practical reasons are built up of a plurality of sections including a hemispherical or ogyval, nose, two or more cylindrical sections of the main body, the after-body, and the tailcone. It is customary to join these sections by means of gasketed joint rings held together by special bolts. The rings, to give rigidity to the joint and for other reasons, are of relatively heavy section so that they can be drilled and tapped. This drilling and tapping is done at a rather small angle with reference to the torpedo axis. The one ring is drilled with a clearance hole and the mating ring is drilled and tapped to receive the joint bolts.

A number of serious objections have been discovered to this type of construction. For example, to recite but some of the objections, drilling holes through the solid rings at an angle is a difficult, expensive and time consuming job. After the holes have eventually been finished so that they match properly in the two rings, it is impossible to face off either or both of the joint rings for the purpose of obtaining a better joint, should such resurfacing of the rings become necessary, without causing one hole to shift with reference to the other. A misalignment is thus produced. Further, a most serious objection is the following: In the event a bolt is broken off or the threads are stripped, it is difficult to remove the broken pieces from the rings. This is particularly serious if the threaded end is broken off in the threaded ring.

One object of our invention is the provision of joint rings that are simple in structure, easy to manufacture, and which rings may be easily and quickly joined.

A broad object of our invention is the elimination of angularly disposed bolts for joining the joint rings between two annular ends of two compartments.

Another somewhat more specific object of our invention is the provision of mating joint rings held together by a plurality of bolts disposed parallel to the axes of the rings in suitable simple mating slots on the rings.

Other objects and advantages will become more apparent from a study of the following specification and the accompanying drawing, in which.

Figure 1:
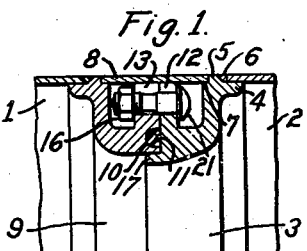
Figure 1 is a sectional view on a longitudinal plane of joint region between two sections of a torpedo.
Figure 2:
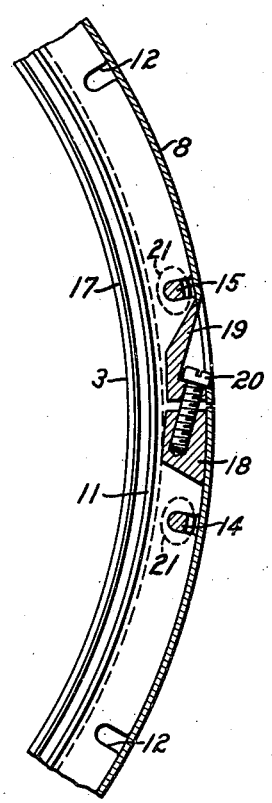
Fig. 2 is a partial view of a transverse section between the rings looking toward the right-hand ring shown in Fig. 1, and illustrating the joint for the covering band for the joint rings.

In Fig. 1, the torpedo sections to be joined are designated by 1 and 2. The ring 3 is provided with a flange 4 having a snug fit in section 2. The ring is so shaped that when in position, a trapezoidal, or V-shaped groove is left between the end of section and the outer ridge 5. This groove we utilize to weld, solder or braze the ring 3 to the section 2 by filling the groove with welding material 6 to make a hermetic seal between the ring 3 and section 2. The ring is also provided with a shoulder 7 of the right dimension to receive the steel covering band 8. The ring is U-shaped in section as shown.

The ring 9, in so far as the foregoing description of ring 3 is concerned, is exactly like ring 3, and is connected to section 1 exactly like ring 3 is connected to section 2.

The adjacent surfaces of legs of the U-shaped sections of the rings are faced off, or machined, so as to make a relatively close fit. The ring 9, near the base of the right-hand leg is provided with an annular groove 10 within which we firmly position a gasket of rubber, neoprene, or some other gasket material. Near the base of the lefthand leg of ring 3, we provide an annular ridge 11 so disposed as to embed itself in a gasket material in the groove 10 when the rings are in joined position.

The adjacent legs of the rings 3 and 9 we provide with a plurality of equally spaced mating U-shaped slots 12 and 13. Into these slots, bolts 21 having the sectional shape shown at 14 and 15 are placed.

Figure 7:
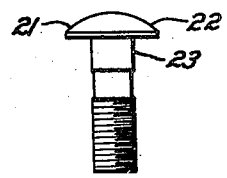
Fig. 7 is a side view of the special bolt we use to connect the rings.
Figure 3:
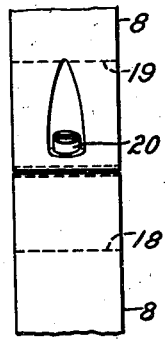
Fig. 3 is a side view of the subject matter shown in Fig. 2.
Figure 8:
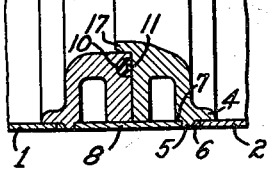
Fig. 8 is a bottom view of the bolt shown in Fig. 7.

The construction of the bolts is rather special as may readily be seen from Figs. 7 and 8. As viewed from the outside when the bolts are in position on the rings the region just below the oval shaped bolt head 22 is square as seen at 23, but actually at this region the bolt is U-shaped in section so that it fits snugly into the bottom of the U-shaped slots 12.

If any one bolt is erroneously inserted in the slots, the steel band cannot be put over the rings. This comes about in this wise: If the square portion just below the head is disposed in a slot 12 to be directed radially inward, the bolt will not go in deep enough so that region 24 projects above the outer periphery of the rings; if the bolt is put in the slot so that its square surface faces circumferentially, which might permit a somewhat deeper disposition of the bolt, then either region 25 or region 26 projects above the outer periphery of the rings. It is thus apparent that if any one of the three possible wrong insertions of the bolt is made, the ring 8 cannot be placed over the rings.

It will be readily seen that this construction facilitates the assembly of the sections very considerably, since no great juggling is necessary to make holes match that cannot be seen. The men assembling the sections can see at a glance when the slots are matched. Then it is merely necessary to drop the bolts in correct position, as shown at 14 and 15, and to tighten the nuts 16. With the bolts shaped as shown, only one wrench is necessary, since the squared portion prevents the bolts from turning.

One of the rings, in the showing, ring 3, is provided with an axial extension 17 tapered somewhat at its outer end to facilitate centering the sections 1 and 2 during assembly. This extension 17 is so dimensioned beyond the beveled outer end region so that it very snugly fits against the inner periphery of the mating ring. By this construction, all shearing stresses are taken by the extension and thus the rings and the bolts are not loaded in the direction of the slots, or transverse of the torpedo axis. This is an important advantage since the torpedo remains rigid even though some bolts may become loose.

When the bolts are all correctly in place and tightened, the band 8, having the threaded end lug 18 and the apertured end lug 19, is placed over the bolts and the bolt 20 is tightened. The outside of the torpedo thus has a streamlined surface and all liquid drag caused by turbulence, that might occur at the joints, is eliminated.

Figure 4:
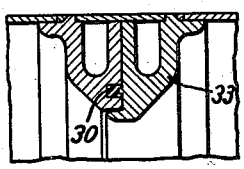
Figs. 4, 5 and 6 show various modifications of the seal used with our special joint ring construction.
Figure 5:
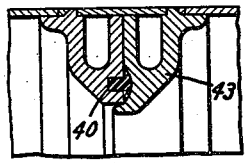
Figure 6:
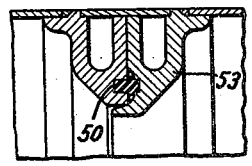

The rings shown in Figs. 4 to 6, inclusive, are substantially of the same construction as the rings shown in Fig. 1; however, the mountings of the gaskets and the types of gaskets used is different in each case. In Figs. 4, 5 and 6, the annular grooves 30, 40 and 50, respectively, corresponding to grooves 10, are rectangular in section. This rectangular construction has the advantage that the gasket which should also be of rectangular section, may be more firmly mounted in the ring so as to be, substantially, an integral part of the ring.

In Fig. 4, the ring 33 at the right is exactly like ring 3, whereas in Figs. 5 and 6, the mating rings 43 and 53 are shaped as shown at the regions coacting with the gasket.

While we have shown but few modifications of our joint rings and a number of modifications of the seal forming part of such rings, we do not wish to be limited to the particular showings made but wish to be limited only by the scope of the claims hereto appended.

We claim as our invention:

1. In a joint for two tubes, in combination, a pair of substantially similar and equally dimensioned rings U-shaped in section with the legs of the U projecting radially outward, a sleeve-like extension at the base of one ring beveled inwardly at its end to facilitate centering of the rings with reference to each other, a plurality of slots in the adjacent legs of the rings, means, adapted to be dropped into the slots so that all parts thereof are below the outer perimeter of the rings, for firmly connecting the rings, two tubes that are to be connected to each other by the rings, and means for hermetically connecting the tubes to the outer edges of the non-adjacent portions thereof.

2. In a joint for two tubes, in combination, a ring having a flat surface at one side and a relatively deep peripheral groove in the outer surface thereof, a tube connected to the ring opposite to the flat side, a similarly dimensioned and constructed ring and tube similarly connected, a plurality of matching slots cut in that portion of the rings between the grooves and the flat surfaces, and tension members disposed in the slots below the perimeters of the rings for firmly connecting the rings.

3. In a joint for two tubes, in combination, a ring having a flat surface at one side and a relatively deep peripheral groove in the outer surface thereof, a tube connected to the ring opposite to the flat side, a similarly dimensioned and constructed ring and tube similarly connected, a plurality of matching slots cut in that portion of the rings between the grooves and the flat surfaces, tension members disposed in the slots below the perimeters of the rings for firmly connecting the rings, a contour at the flat surface of one ring for receiving a rubber-like gasket, a rubber-like gasket mounted on the contour, a cooperating contour at the flat surface of the other ring, whereby an effective fluid seal is provided at the flat surfaces when the rings are firmly connected by the tension members.

4. Joint rings for joining together the ends of two tubes, in combination, a tube, a ring U-shaped in section having a flange at the end of one leg having an outside diameter to fit snugly into the end of the tube, means for hermetically connecting the tube to the ring near the base of the flange, a second tube, a similar ring having a U-shaped transverse section similarly hermetically connected to an end of the second tube, an annular, beveled, extension near the bight of the U on one of the rings and extending substantially parallel to the ring axis whereby centering of one ring with reference to the other is facilitated when the rings are brought together so that the leg portions remote from the flanges are contiguous, a plurality of equally spaced U-shaped matching slots in the contiguous legs of the rings, bolts disposed in the slots, nuts for the bolts to draw the rings firmly together, and an annular gasket on one of the rings coacting with a deformed region on the other ring to provide a seal when the rings are brought together by the tightening of the nuts on the bolts.

5. In a joint for two tubes, in combination, a ring having a U-shaped transverse section and having a sleeve-like flange disposed at the end of one leg of the U projecting in the axial direction of the ring and further having a sleeve-like second flange disposed at the bight, or base, of the U projecting in the axial direction of the ring and being disposed on the side of the ring opposite to the first flange, a tube connected to the flange at the end of the leg of the U, a second ring and second tube similar in construction, except for the absence of the second flange, and similarly connected to the second tube, an arcuate gasket seat at the junction of the second flange and the base of the first ring, a gasket circular in section, when not deformed, disposed on the arcuate seat, a gasket deforming region on the second ring, in section having the appearance of a shallow hat, or monk's hat, disposed with the bottom toward the gasket seat and cocked at an angle to the ring axis, a plurality of slots in the adjacent leg of the U of each of the rings, bolts disposed in the slots, nuts for the bolts for drawing the rings together to connect the tubes and to deform the gasket to provide a fluid seal between the rings.

MERRILL G. LEONARD.
JOHN A. GUIDOSH.

REFERENCES CITED

The following references are of record in the file of this patent:

UNITED STATES PATENTS

| Number | Name | Date |
| --- | --- | --- |
| 2,294,806 | Samans | Sept. 1, 1942 |
| 1,563,836 | Copp | Dec. 1, 1925 |

FOREIGN PATENTS

| Number | Country | Date |
| --- | --- | --- |
| 93,051 | German | Nov. 22, 1896 |